US006848722B2

(12) United States Patent
Jeory

(10) Patent No.: US 6,848,722 B2
(45) Date of Patent: Feb. 1, 2005

(54) COUPLING

(75) Inventor: James Jeory, Preston (GB)

(73) Assignee: James Jeory, Christine Patricia Jeory and Stephen Gerard Ward T/A Premier Hydraulics & Pneumatics (GB)

( * ) Notice: Subject to any disclaimer, the term of this patent is extended or adjusted under 35 U.S.C. 154(b) by 0 days.

(21) Appl. No.: 10/205,759

(22) Filed: Jul. 26, 2002

(65) Prior Publication Data

US 2003/0025096 A1 Feb. 6, 2003

(30) Foreign Application Priority Data

Aug. 1, 2001 (GB) .............................................. 0118742

(51) Int. Cl.$^7$ .......................... F16L 37/00; F16K 15/00
(52) U.S. Cl. .......................... 285/305; 285/81; 285/82; 137/515.5
(58) Field of Search .......................... 285/305, 81, 82; 137/515.5

(56) References Cited

U.S. PATENT DOCUMENTS

| | | | | |
|---|---|---|---|---|
| 1,745,304 A | * | 1/1930 | Lemex | 137/513.7 |
| 3,051,196 A | * | 8/1962 | Miller | 137/516.29 |
| 3,422,840 A | * | 1/1969 | Bryant et al. | 137/384 |
| 3,880,130 A | * | 4/1975 | Hecht | 123/574 |
| 4,003,401 A | * | 1/1977 | Haring | 137/599.18 |
| 4,069,947 A | * | 1/1978 | Oakes | 222/5 |
| 4,195,661 A | * | 4/1980 | Takeuchi | 137/515.5 |
| 4,800,925 A | * | 1/1989 | Yeoman | 138/46 |
| 4,938,255 A | * | 7/1990 | Lanfri et al. | 137/565.23 |
| 4,991,627 A | * | 2/1991 | Nix | 137/614.03 |
| 5,524,938 A | * | 6/1996 | Halder | 285/201 |
| 5,544,858 A | * | 8/1996 | Rogers et al. | 251/149.6 |
| 5,595,213 A | * | 1/1997 | Brown | 137/515.5 |
| 5,707,152 A | * | 1/1998 | Krywitsky | 374/208 |
| 5,711,549 A | * | 1/1998 | Beans | 285/93 |
| 5,716,081 A | * | 2/1998 | Leigh-Monstevens et al. | 285/319 |
| 5,810,047 A | * | 9/1998 | Kirkman | 137/614.01 |
| 5,901,743 A | * | 5/1999 | Schulz | 137/515.5 |
| 5,904,382 A | * | 5/1999 | Bronnert | 285/349 |
| 6,123,655 A | * | 9/2000 | Fell | 494/50 |

* cited by examiner

Primary Examiner—James M. Hewitt
(74) Attorney, Agent, or Firm—Gauthier & Connors LLP

(57) ABSTRACT

A coupling for connecting a vacuum line to a body such as an autoclave to be evacuated, the coupling having a first part adapted to be sealingly engaged by welding upon the wall of the autoclave about an aperture therein, and having an internal bore which thus communicates with the interior of the autoclave, and a second part also having an internal bore for communication with the bore of the first part. The second part thus serves as a removable cartridge which is slidably engaged within the first part with sealing rings radially and axially sealing the two-parts together to prevent fluid leakage therebetween. The cartridge includes a spring-loaded valve. A circlip enables separation of the cartridge from the first part, and a circlip enables removal of the valve parts from the cartridge.

10 Claims, 2 Drawing Sheets

COUPLING

BACKGROUND OF THE INVENTION

1. Field of the Invention

THIS INVENTION relates to coupling devices and particularly a coupling for connecting a vacuum line to a body such as an autoclave having an internal chamber to be evacuated.

2. Description of the Prior Art

A coupling of this kind conventionally comprises a cylindrical body which is threadedly engaged upon the wall of the autoclave about an aperture therein, using PTFE tape or the like to provide a seal and to prevent leakage past the thread. Such a coupling requires frequent replacement in view of the high temperatures experienced in the operation of such equipment. This is carried out by unscrewing the coupling from the autoclave wall and replacing it with renewed tape or other sealing medium.

Notwithstanding frequent replacement, there is a continuous risk of leakage past the thread.

SUMMARY OF THE INVENTION

It is an object of the present invention to provide a coupling of this kind for such an application, where the risk of leakage is at least substantially avoided and where replacement of any part of the coupling is required much less frequently.

According to the present invention there is provided a coupling for connecting a vacuum line to a body having an internal chamber to be evacuated, the coupling comprising a first part adapted to be sealingly engaged upon the wall of a body about an aperture therein and having an internal bore which thus communicates with the internal chamber of the body, and a second part also having an internal bore for communication with the bore of the first part, the second part being removably and slidably engaged with the first part, sealing means cooperating with the first and second parts to prevent fluid leakage there between, and means for readily enabling separation of the two parts.

The first or second part may have an internal valve adapted to seal a passage through the coupling except when connected to a vacuum line.

The valve may be removably retained within the coupling by a circlip.

The sealing means which cooperates with the first and second parts may comprise a first seal ring adapted to seal in an axial direction of the coupling between two cooperating radial faces respectively of the two parts, and at least one further seal ring forming a seal between cooperating axial faces of the two parts.

The means for readily enabling separation of the two parts may comprise a circlip cooperating between an annular face of one part and a cylindrical wall of the other of said parts and readily accessible externally of the coupling thus to enable removal of the second part from the first part.

The second part may be removably and slidably engagable within a cylindrical recess in the first part and the sealing means may comprise a plurality of O-rings mounted on the second part and cooperating with internal faces of the first part.

The first part may include a spigot adapted to be received within the aperture in the wall of the body and to be fixed therein by welding.

Both parts of the coupling may be predominantly of stainless steel.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENT

Figure 1:
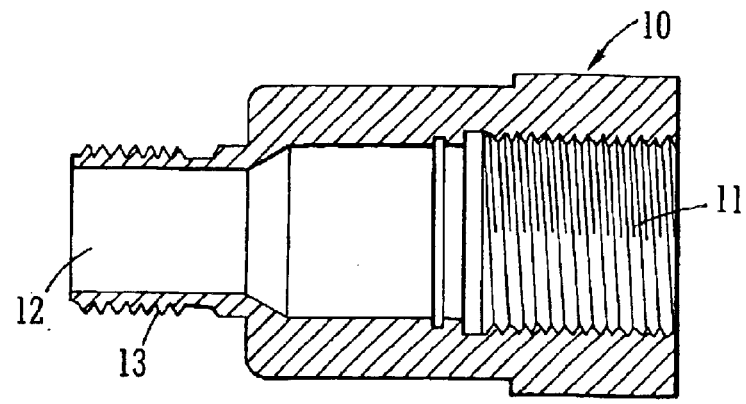
FIG. 1 is a cross-sectional view of a conventional coupling for connecting a vacuum line to a body having an internal chamber to be evacuated.

Referring now to FIG. 1, in a conventional arrangement the coupling comprises a cylindrical body 10 having in one end region an internal thread 11 adapted to be engaged upon an externally threaded spigot welded or otherwise attached sealingly to a body such as an autoclave having an internal chamber to be evacuated.

A valve mechanism (not shown) is provided within the bore 12 of the body 10 such that the central passage through the coupling shall be closed except when connected to a vacuum line having an actuator to open the valve.

The body 10 comprises a spigot 13 to which a vacuum line is conventionally attached.

The threaded connection between the body 10 and the spigot on the autoclave provides an inadequate seal without the use of PTFE tape or the like which thus requires frequent replacement. Between replacements there remains the risk of leakage across the thread and so such an arrangement is unreliable in some circumstances.

Figure 2:
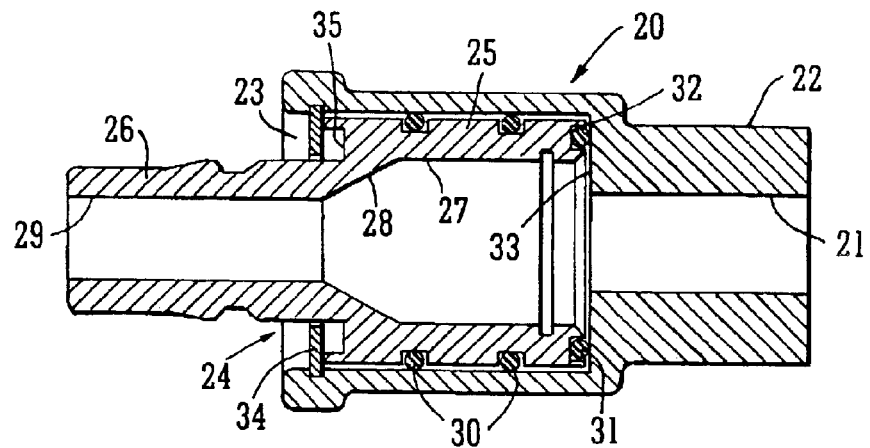
FIG. 2 is a similar view but of a coupling made in accordance with the invention.

Referring now to FIG. 2, a coupling made in accordance with the invention comprises two parts the first being a cylindrical body 20 having a central axial passage 21 and at one end a spigot 22 which may be plain faced or grooved as required but is adapted to be inserted into an aperture in an autoclave wall, to be in communication through the passage 21 with an internal chamber to be evacuated, the spigot 22 being preferably welded into the aperture thus to be permanently attached and sealed therein.

The cylindrical body 20 defines an internal cylindrical recess 23 into which passes a cartridge generally indicated at 24. The cartridge comprises a cylindrical body 25 and a spigot 26 to which a vacuum line may be connected. A central passage 27 within the body 25 is tapered at 28 to provide a valve seat as will be described and communicates with a narrower bore 29 extending centrally and axially within the spigot 26.

O-rings 30 are situated around the body 25 within annular grooves therein and serve as a seal between the opposed cylindrical walls of the recess 23 and the body 25, while a further O-ring 31 is located in an outwardly open annular groove on an inner end face 32 of the body 25 and therefore bears against an end face 33 of the body 20.

Thus, the second part or cartridge 24 of the coupling is slidably and removably engaged within the recess 23 of the first part 20. A circlip 34 removably fixes the two parts together, an annular groove 35 being provided in an outer end wall of the part 24 to enable access with circlip pliers for removal of the circlip 34.

Figure 3:
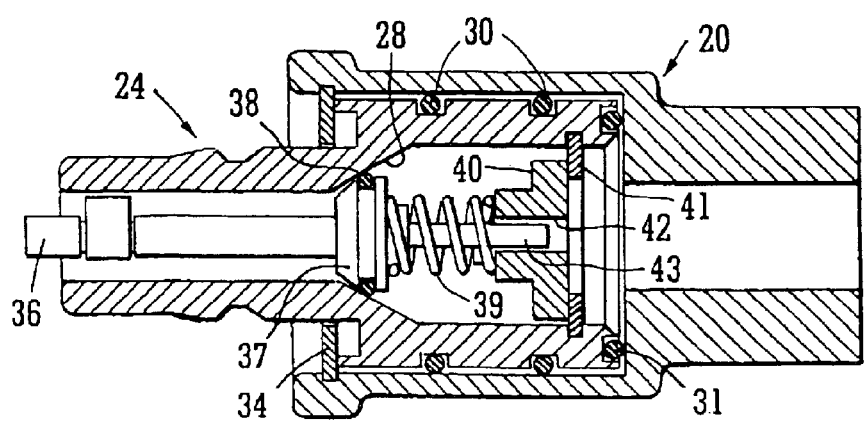
FIG. 3 is a view similar to FIG. 2 illustrating, within the coupling, a closure valve.
Figure 4:
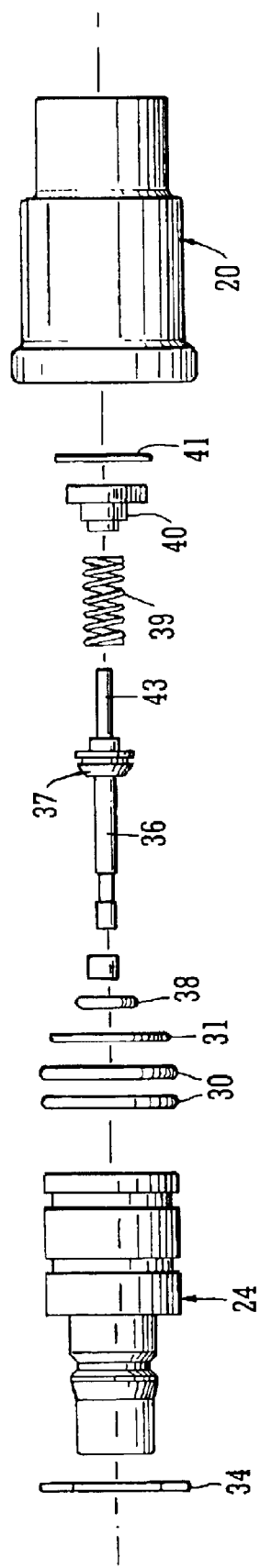
FIG. 4 is an exploded view of the parts of which the coupling is comprised.

Referring now to FIGS. 3 and 4 it can be seen that within the second part 24 of the coupling there may be located a valve pin 36 carrying a valve member 37 with an O-ring 38 to seal against the tapering wall 28 of the bore 27, and a coil spring 39 normally urges the valve member 37 into the closed condition to seal the passage. The spring 39 engages a member 40 having a central bore 42 through which passes an extension 43 of pin 36. The member 40 is maintained within the bore 27 of the second part of the coupling by means of a circlip 41.

In use therefore with the first part 20 permanently attached to an autoclave wall the cartridge or second part of the coupling may be readily removed by first removing the circlip 34. Any parts of the valve mechanism to be replaced are then easily withdrawn from the second part of the coupling after removal of the circlip 41.

For connection of the coupling to a vacuum line the valve is opened by engagement and movement of the pin 36 to lift the valve member 37 from the tapered wall portion 28 against the action of spring 39. A conventional connector (not shown) for attachment of the coupling to the vacuum line containing an actuator which depresses the pin 36 when the connector is attached to the spigot 26.

It will be appreciated that the coupling includes no threaded parts through which leakage may occur, and the vacuum created within the autoclave chamber serves only to draw the cartridge inwardly thus enhancing the seal between the O-ring 31 and the face 33 of the first part of the coupling.

The two parts of the coupling are preferably made from stainless steel but may be of any material suitable to the application and the ambient conditions thereof.

It is not intended to limit the invention to the arrangement described and illustrated herein. For example, the two parts could be reversed in function i.e the second part could be permanently fixed to the autoclave wall with the first part being removably and slidably engaged therewith. The essence of the invention is the avoidance of a threaded interface between the coupling and the body to be evacuated, and that ready removal and dismantling of the coupling can be effected for replacement of the valve parts if and when necessary.

What is claimed is:

1. A coupling for connecting a vacuum line to a body having an internal chamber to be evacuated, the coupling comprising a first part adapted to be sealingly engaged upon the wall of a body about an aperture therein and having an internal bore which thus communicates with the internal chamber of the body, and a second part also having an internal bore for communication with the bore of the first part, the second part being removably and slidably engaged within the first part, an internal valve disposed to close a passage through the internal bores of the first and second parts except when connected to a vacuum line the valve having a valve member normally sealing upon an internal wall portion of the passage with the first and second parts engaged, sealing means co-operating with the first and second parts to prevent fluid leakage therebetween, means for readily enabling separation of the two parts, and a valve pin connected to the valve member to lift the valve member from the internal wall portion to open the passage.

2. A coupling according to claim 1, including means for removably retaining the valve within the coupling.

3. A coupling according to claim 1, wherein the sealing means which co-operates with the first and second parts comprises a first seal ring adapted to seal in an axial direction of the coupling between two co-operating radial faces respectively of the two parts, and at least one further seal ring forming a seal between co-operating axial faces of the two parts.

4. A coupling according to claim 1, wherein the means for readily enabling separation of the two parts comprises a circlip co-operating between an annular face of one of the parts and a cylindrical wall of the other of said parts, and readily accessible externally of the coupling thus to enable removal of the second part from the first part.

5. A coupling according to claim 1, wherein the second part is removably and slidably engageable within a cylindrical recess in the first part and the sealing means comprises a plurality of O-rings mounted on the second part and co-operating with internal faces of the first part.

6. A coupling according to claim 1, wherein the first part includes a spigot adapted to be received within the aperture in the wall of the body and to be fixed therein by welding.

7. A coupling according to claim 1, wherein both parts of the coupling are predominantly of stainless steel.

8. A coupling according to claim 1, wherein the internal wall portion is tapered and the valve member is spring-loaded, and the valve pin lifts the valve member from the tapered wall portion against the action of the spring to open the passage.

9. A coupling according to claim 8, wherein the spring engages a member attached within the internal bore of the second part, said member being removable therefrom to permit removal of the valve from the second part.

10. A coupling according to claim 8, wherein the valve pin includes an extension which passes through a bore in said removable member.

* * * * *